Sept. 26, 1967    U. A. MOORES    3,343,521
AUTOMATED BARN
Filed April 27, 1966
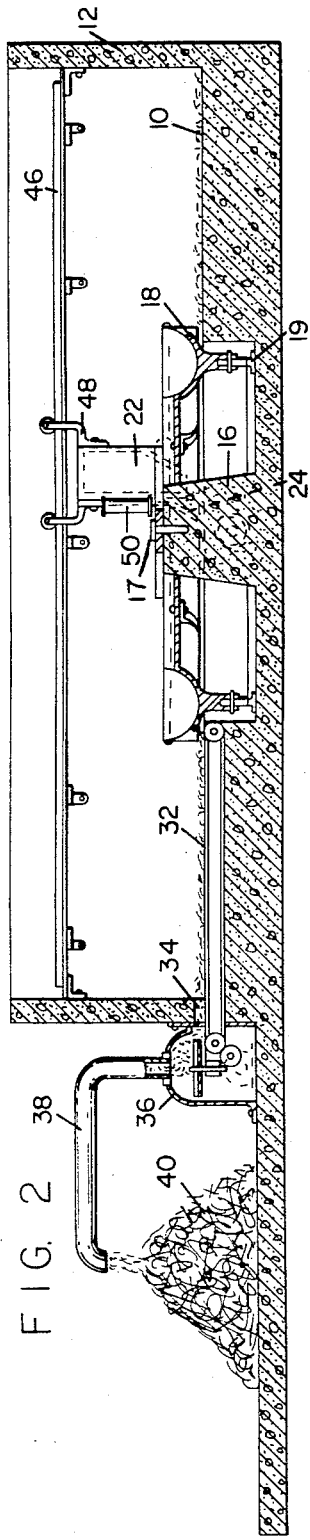
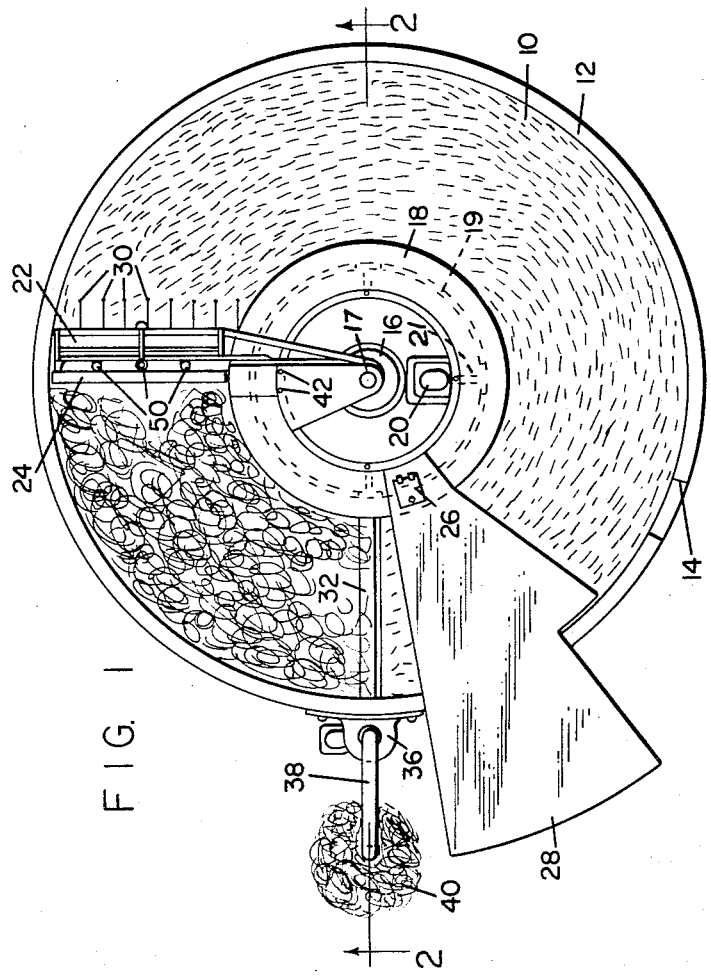
INVENTOR
URBAN A. MOORES
BY *Charles R. Fay*
ATTORNEY United States Patent Office 3,343,521
Patented Sept. 26, 1967

3,343,521
AUTOMATED BARN
Urban A. Moores, R.F.D. 1, Springfield, Maine 04487
Filed Apr. 27, 1966, Ser. No. 545,615
5 Claims. (Cl. 119—20)

ABSTRACT OF THE DISCLOSURE

A circular enclosure includes a floor and wall with a rotatable feed manger positioned therein detachably connectable with a bedding hopper having a floor cleaning blade mounted thereon. Conveyor means positioned in the floor to receive waste and discharge the same from the enclosure.

---

This invention relates to an automatic or power-operated barn, poultry-house or the like, the essential characteristic of which resides in the fact that it is generally circular and can be powered with a revolving, radially extending member in the form of a blade or the like which sweeps over the entire floor when the animals are absent, scraping all of the used litter and other waste to a run-off conveyor or carry-off container for disposal thereof.

The invention also contemplates the use of a like powered hopper in radial form which is rotated about the center of the circular barn and distributes in desired quantity new litter material for clean bedding; and the provision of a manger or the like which can provide measured quantities of feed say for instance at or near the center of the barn so that when the cleaning devices aforesaid are not in operation, the animals can be stationed in the barn also in general radially arranged position with their heads inwardly located near the manger. Water can also be provided in like manner or otherwise. The power apparatus may be also centrally located, there being provided for instance an annular track adjacent the periphery of the barn to support the blade and hopper or other power operated mechanisms as they run around the circular barn.

Other objects and advantages of the invention will appear hereinafter.

Reference is to be had to the accompanying drawings in which:

FIG. 1 is a plan view with parts omitted showing the barn as it would appear with the roof removed; and FIG. 2 is a cross sectional view thereof.

Although the arrangement of the barn can be greatly modified and expanded, it is shown herein as having a generally circular flat floor 10 with a circular rim 12. A door or the like 14 may be provided and of course this door may be repeated at other locations about the periphery of the device.

I prefer to provide a central upright standard or support 16 although this could also be a cylindrical member as well but it provides a base for a pivot pin 17 for a rotating manger 18 supported on an appropriate track 19 and which can be powered in any way desired as for instance by a proper motor 20 having a driving engagement 21 with the manger.

The manger 18 can rotate at as for instance under a fixed trap door 26 through which the fodder can be deposited thereon, evenly distributing the fodder about the entire length of the manger 18. The fodder can be loaded on a fixed platform 28 and pushed through the trap door or in fact the loading platform 28 could be arranged on an angle and given proper high sides and the like to contain the fodder from dropping off and it will descend by gravity to the trap door providing a constant supply of fodder thereto.

It is preferred that the manger shall be enabled to operate separately from the cleaning blade 24 and the bedding hopper 22 because the manger has to be operated either continuously or several times a day, depending upon the number of animals in the barn and the capacity of the manger. On the other hand, the cleaning apparatus need be operated only once or twice a day at the most.

I prefer to provide electric cattle goads or the like as indicated at 30 so as to insure that all of the cattle or other animals shall be driven from the barn prior to approach of the cleaning blade.

The cleaning blade 24 and the bedding hopper 22 can of course be parts of a single unit as long as the bedding is deposited after the cleaning action of the cleaning blade 24 and one single revolution of the apparatus about the center is all that is required in order to clean the barn of manure and old bedding, straw, etc. and to deposit fresh bedding material.

There is also provided a waste outlet that can be a mere opening, to a pit, or a manure cleaning conveyor as at 32. This may conveniently run radially carrying the waste out through an opening 34 to a heap or pit at 36, or a blower 38 can be provided to remove the cleaned out material to a more distant manure heap 40 or into the usual spreader, etc.

As stated above, the cleaning blade and bedding hopper may be separately powered from the rotary manger; or through well known suitable clutches, etc., may be driven by the same motor and at separate times and speeds. However it is also possible to merely mechanically connect the cleaning blade and bedding hopper by pins 42 received in holes in the manger to operate the same together from a single motor, merely in order to rotate the cleaning and bedding unit. When this unit has completed its task, it can then be unpinned from the manger and the manger rotated with the animals in position. This makes a simple easily operated and inexpensive arrangement for the power operation of the devices which essentially are three in number, i.e., the manger, the cleaning blade, and the bedding hopper. Suitable rollers or wheels can be used on the manger and hopper, and if extra tracks for a larger installation are needed, the same can be easily provided on the floor.

However, an elevated track 46 is easily installed, and a barn door trolley 48 can be used to suspend the hopper on the track. Also, the blade 24 can be made to be easily removed from the bedding hopper 22, or it can be mounted on the hopper to be raised from the floor by springs or power cylinders 50 on the hopper having pistons connected to the blade.

The cleaning blade when not in use remains at the 0° position, i.e., next to the cleanout belt. This leaves the rest of the stable free for the use of the cattle. When the cleaning blade is in the 0° position, the electric goads are not energized.

However when the operator wants to clean the stable of manure and stale bedding, he first throws a switch which activates the electric goads. The operator then rotates the cleaning blade in a clockwise direction, and the electric goads will drive the cattle ahead of them and force the cattle out of the stable. When the stable is free of cattle, the operator can then change the direction of rotation of the cleaning blade to a counterclockwise direction and sweep the manure and debris onto the moving belt.

Having thus described my invention and the advantages thereof, I do not wish to be limited to the details herein disclosed, otherwise than as set forth in the claims, but what I claim is:

1. An automated barn, comprising a generally circular floor and wall means, a circular track mounted on the wall means, a central support secured with the floor, a centrally arranged annular manger rotatably mounted about the central support, power means for rotating the manger, a bedding hopper for the floor mounted in radially arranged position with respect thereto and supported by pivotally mounted means on the central support and means engaging the track, said bedding hopper having a cleaning blade secured therewith and detachable means connecting the pivotally mounted means to the manger for rotation of the bedding hopper and blade.

2. The automated barn of claim 1 including adjustible means mounting the blade on the hopper to clean the floor prior to the deposition of the bedding on the floor.

3. The automated barn of claim 1 including fixed means for depositing feed in the manger.

4. The automated barn of claim 1 including said track being arranged in overhead relationship with respect to said hopper, the hopper and therefore the blade being suspended therefrom.

5. The automated barn of claim 1 including a radially arranged clean-out mechanism receiving waste from the barn floor as scraped by the blade, said clean-out mechanism including a conveyor moving in a radial direction to move the waste out from the barn, and means receiving the waste exteriorly of the barn.

References Cited

UNITED STATES PATENTS

| | | | |
|---|---|---|---|
| 2,930,352 | 3/1960 | Kasten | 119—52 |
| 3,021,819 | 2/1962 | Krahan | 119—22 |
| 3,158,137 | 11/1964 | Summerour | 119—22 |

SAMUEL KOREN, *Primary Examiner.*

HUGH R. CHAMBLEE, *Examiner.*